US009215598B2

(12) United States Patent
Vuyyuru et al.

(10) Patent No.: US 9,215,598 B2
(45) Date of Patent: Dec. 15, 2015

(54) OPTIMIZING DYNAMIC SPECTRUM ACCESS

(75) Inventors: Rama K. Vuyyuru, Sunnyvale, CA (US); Si Chen, Atherton, CA (US)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 846 days.

(21) Appl. No.: 13/294,084

(22) Filed: Nov. 10, 2011

(65) Prior Publication Data

US 2013/0122819 A1 May 16, 2013

(51) Int. Cl.
*H04B 15/00* (2006.01)
*H04W 16/14* (2009.01)
*H04W 72/02* (2009.01)
*H04W 72/06* (2009.01)

(52) U.S. Cl.
CPC ............ *H04W 16/14* (2013.01); *H04W 72/02* (2013.01); *H04W 72/06* (2013.01)

(58) Field of Classification Search
CPC . H04W 72/02; H04W 72/085; H04B 17/0077
USPC .................. 455/62, 456.1, 456.3, 67.11, 509
See application file for complete search history.

(56) References Cited

U.S. PATENT DOCUMENTS

| | | | |
|---|---|---|---|
| 2005/0065711 A1* | 3/2005 | Dahlgren et al. ............ 701/117 |
| 2006/0079252 A1* | 4/2006 | Obradovich et al. ...... 455/456.3 |
| 2010/0075704 A1* | 3/2010 | McHenry et al. ............ 455/509 |
| 2010/0248631 A1* | 9/2010 | Chaudhri et al. ............. 455/62 |
| 2010/0304678 A1* | 12/2010 | Chandra et al. .............. 455/62 |
| 2011/0075586 A1* | 3/2011 | Hu et al. ..................... 370/252 |
| 2011/0090853 A1* | 4/2011 | Chandramouli et al. ..... 370/329 |
| 2011/0299408 A1* | 12/2011 | Gunawardena et al. ..... 370/252 |
| 2012/0120883 A1* | 5/2012 | Chen et al. .................. 370/329 |
| 2013/0122819 A1* | 5/2013 | Vuyyuru et al. ............... 455/62 |
| 2013/0237263 A1* | 9/2013 | Vuyyuru ...................... 455/509 |
| 2013/0258878 A1* | 10/2013 | Wakikawa et al. ........... 370/252 |

OTHER PUBLICATIONS

NPL:Feasiblity analysis of vehicular dynamic spectrum access via queueing theory model. SI Chen, Nov. 1, 2011.*
Chen, Si et al., On Optimizing Vehicular Dynamic Spectrum Access Networks: Automation and Learning in Mobile Wireless Environments, Vehicular Networking Conference (VNC), Nov. 14-16, 2011, pp. 39-46, IEEE, Amsterdam, The Netherlands.

(Continued)

*Primary Examiner* — Bobbak Safaipour
*Assistant Examiner* — Md Talukder
(74) *Attorney, Agent, or Firm* — Patent Law Works LLP

(57) ABSTRACT

A system and method for optimizing spectrum access in data communications is disclosed. The system comprises a case module, a selection engine, an evaluation module and an update module. The case module determines a present case based at least in part on sensor data and environmental data, determines a matching case for the present case and configures one or more channel profiles for the present case based at least in part on the matching case. The selection engine selects a first channel based on the one or more channel profiles. The first channel is associated with a first channel profile from the one or more channel profiles. The evaluation module evaluates a first channel performance for the first channel and generates a first channel reward for the first channel. The update module updates the first channel profile based at least in part on the first channel reward.

30 Claims, 11 Drawing Sheets

(56) References Cited

OTHER PUBLICATIONS

Chen et al., "Feasibility Analysis of Vehicular Dynamic Spectrum Access via Queueing Theory Model", IEEE Communications Magazine, IEEE Service Center, Piscataway, US, vol. 49, No. 11, Nov. 1, 2011, pp. 156-163.

Ahmadi et al., "Predictive Opportunistic Spectrum Access using Learning based Hidden Markov Models", Personal Indoor and Mobile Radio Communications (PIMRC), 2011 IEEE 22nd International Symposium on, IEEE, Sep. 11, 2011, pp. 401-405.

Chen et al., "Learning-Based Channel Selection of VDSA Networks in Shared TV Whitespace", 2012 IEEE Vehicular Technology Conference (VTC Fall), Sep. 1, 2012, pp. 1-5.

Chen et al., "Learning in vehicular dynamic spectrum access networks: Opportunities and challenges", Intelligent Signal Processing and Communications Systems (ISPACS), 2011 International Symposium on IEEE, Dec. 7, 2011, pp. 1-6.

International Preliminary Report on Patentability, PCT/JP2012/079873 mailed May 22, 2014 (13 pages).

* cited by examiner

OPTIMIZING DYNAMIC SPECTRUM ACCESS

BACKGROUND

The specification relates to data communication systems. In particular, the specification relates to a system and method for optimizing dynamic spectrum access in vehicular communications.

There is a trend that more and more consumer devices are embedded in a vehicle that request data exchange or services from a remote entity (e.g., a vehicle, a roadside service node, an infrastructure system, a server, etc.), causing a high demand for wireless network access from vehicles on the road. Since radio spectrum is a scarce and expensive resource for wireless communications, it is highly desirable to implement a system that utilizes this scarce spectrum in an efficient way to achieve a better network performance. However, existing systems for spectrum access have been proven deficient and have numerous problems.

First, existing systems using dedicated channels such as dedicated short-range communications fail to provide high bandwidth connection and therefore fail to prevent channel congestion when there is a large amount of data waiting for transmission. The existing systems using dedicated channels therefore fail to provide satisfactory services for massive data transmission.

Second, existing systems using cellular networks such as 3G and/or 4G cellular networks have limited coverage and fail to provide services at locations not covered by the cellular networks. The existing systems using cellular networks also have strict access constraints such that the services provided by the cellular networks are only available to a limited amount of users. For example, users that are not subscribers to the cellular networks are not allowed to use the cellular networks for data transmission.

SUMMARY OF THE INVENTION

The specification overcomes the deficiencies and limitations of the prior art at least in part by providing a system and method for optimizing dynamic spectrum access in vehicular communications. The system comprises a case module, a selection engine, an evaluation module and an update module. The case module determines a present case based at least in part on sensor data and environmental data, determines a matching case for the present case and configures one or more channel profiles for the present case based at least in part on the matching case. The selection engine selects a first channel based on the one or more channel profiles. The first channel is associated with a first channel profile from the one or more channel profiles. The evaluation module evaluates a first channel performance for the first channel and generates a first channel reward for the first channel. The update module updates the first channel profile based at least in part on the first channel reward.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
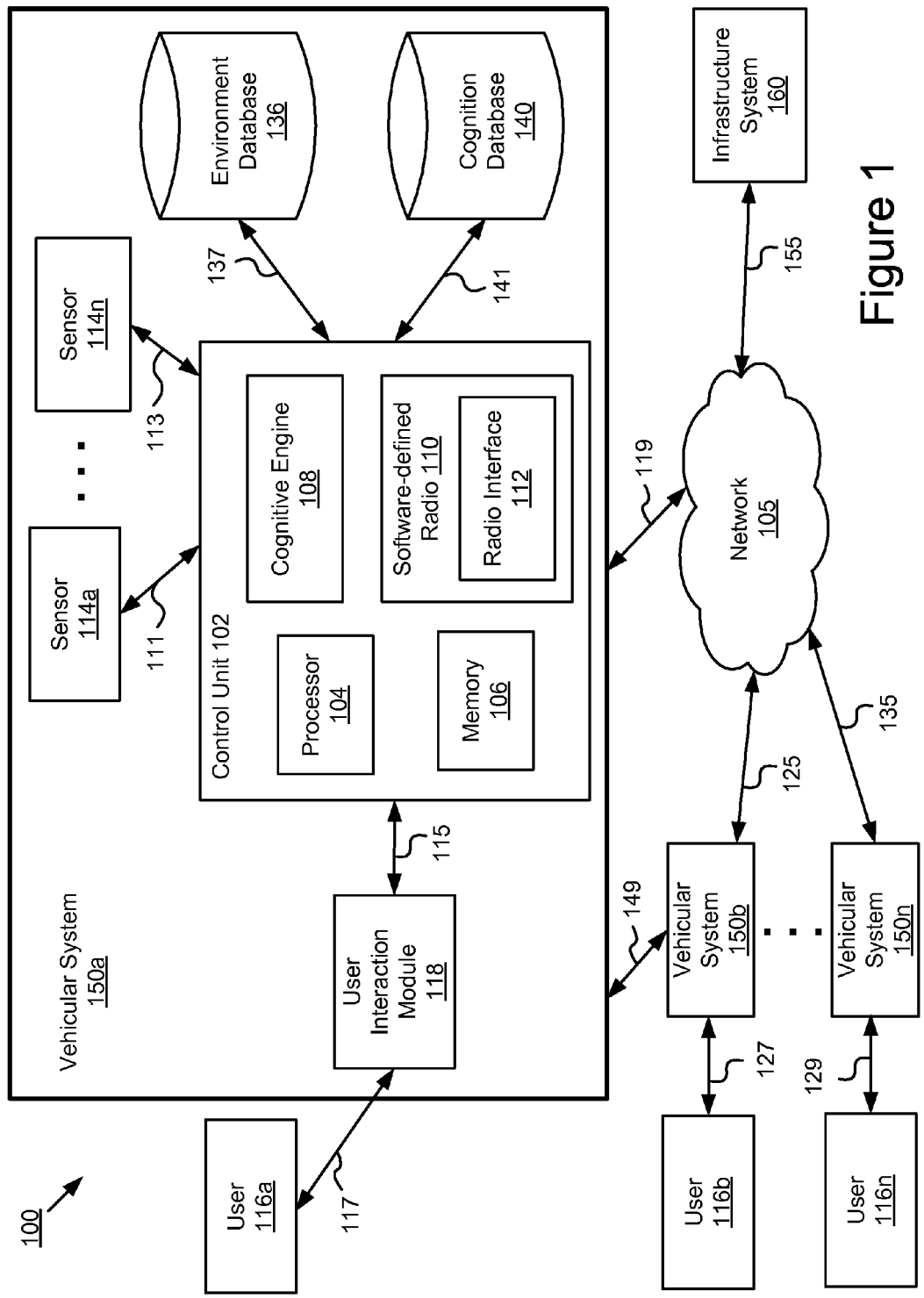
FIG. 1 is a high-level block diagram illustrating a system for optimizing dynamic spectrum access according to one embodiment.

A system and method for optimizing dynamic spectrum access is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for optimizing dynamic spectrum access according to one embodiment. The illustrated system 100 includes one or more vehicular systems 150a, 150b . . . 150n (referred to individually or collectively as vehicular system 150) that are accessed by users 116a, 116b . . . 116n and an infrastructure system 160. These entities of the system 100 are communicatively coupled to each other. In the illustrated embodiment, these entities are communicatively coupled via a network 105.

The vehicular systems 150a, 150b . . . 150n in FIG. 1 are used by way of example. While FIG. 1 illustrates three vehicular systems, the description applies to any system architecture having any number of vehicular systems. Furthermore, while only one network 105 is coupled to the vehicular systems 150a, 150b . . . 150n and the infrastructure system 160, in practice any number of networks 105 can be connected to the entities.

In the illustrated embodiment, the vehicular system 150a is communicatively coupled to the vehicular system 150b via signal line 149. The vehicular system 150a is communicatively coupled to the network 105 via signal line 119. The user 116a interacts with the vehicular system 150a via signal line 117. The vehicular system 150b is communicatively coupled to the network 105 via signal line 125. The user 116b interacts with the vehicular system 150b via signal line 127. The vehicular system 150n is communicatively coupled to the network 105 via signal line 135. The user 116n interacts with the vehicular system 150n via signal line 129. The infrastructure system 160 is communicatively coupled to the network 105 via signal line 155.

The network 105 is a conventional type of network, wired or wireless, and may have any number of configurations such as a star configuration, token ring configuration or other configurations known to those skilled in the art. In one embodiment, the network 105 comprises one or more of a local area network (LAN), a wide area network (WAN) (e.g., the Internet) and/or any other interconnected data path across which multiple devices communicate. In another embodiment, the network 105 is a peer-to-peer network. The network 105 is coupled to or includes portions of a telecommunications network for sending data in a variety of different communication protocols. For example, the network 105 is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 105 are encrypted using conventional encryption technologies such as secure sockets layer (SSL), secure HTTP and/or virtual private networks (VPNs).

The vehicular system 150 is a system for data communication embedded in a vehicle. The vehicular system 150 includes, among other things, a control unit 102, one or more sensors 114a and 114n (referred to individually or collectively as sensor 114), a user interaction module 118, an environment database 136 and a cognition database 140. Although only two sensors 114a and 114n are illustrated, one skilled in the art will recognize that any number of sensors 114 are available. Furthermore, while only one control unit 102, one user interaction module 118, one environment database 136 and one cognition database 140 are depicted in the vehicular system 150, the vehicular system 150 could include one or more control units 102, one or more user interaction modules 118, one or more environment databases 136 and one or more cognition databases 140. One skilled in the art will also appreciate that the vehicular system 150 may include other components not shown in FIG. 1 such as an input device, a network adapter and other components conventional to a vehicular system.

In the illustrated embodiment, the sensor 114*a* is communicatively coupled to the control unit 102 via signal line 111. The sensor 114*n* is communicatively coupled to the control unit 102 via signal line 113. The user interaction module 118 is communicatively coupled to the control unit 102 via signal line 115. The user 116 interacts with the user interaction module 118 via signal line 117. The environment database 136 is communicatively coupled to the control unit 102 via signal line 137. The cognition database 140 is communicatively coupled to the control unit 102 via signal line 141.

The control unit 102 is any processor-based computing device. For example, the control unit 102 is an electronic control unit ("ECU") embedded in a vehicle. In one embodiment, the control unit 102 is implemented using a single integrated circuit such as a system-on-chip (SOC). The control unit 102 comprises, among other things, a processor 104, a memory 106, a cognitive engine 108 and a software-defined radio 110. In one embodiment, the control unit 102 includes other conventional components such as an I/O interface (not pictured).

The processor 104 comprises an arithmetic logic unit, a microprocessor, a general purpose controller or some other processor array to perform computations, retrieve data stored on the environment database 136 and/or the cognition database 140, etc. The processor 104 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 106 stores instructions and/or data that may be executed by the processor 104. The instructions and/or data may comprise code for performing any and/or all of the techniques described herein. The memory 106 may be a dynamic random access memory (DRAM) device, a static random access memory (SRAM) device, flash memory or some other memory device known in the art. In one embodiment, the memory 106 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The cognitive engine 108 is code and routines for providing dynamic spectrum access for a vehicular system 150. For example, the cognitive engine 108 provides adaptive channel selection in a whitespace spectrum for a vehicular system 150 using machine learning techniques. A whitespace spectrum is an unused radio spectrum. For example, a whitespace spectrum is a TV whitespace spectrum. In one embodiment, the cognitive engine 108 includes code and routines stored in an on-chip storage (not pictured) of the processor 104. In another embodiment, the cognitive engine 108 is implemented using hardware such as a field-programmable gate array (FPGA) or an application-specific integrated circuit (ASIC). In yet another embodiment, the cognitive engine 108 is implemented using a combination of hardware and software.

In one embodiment, the cognitive engine 108 is implemented based at least in part on application-specific task requirements. For example, support vector machines and/or artificial neural networks are used to implement classifiers in the learning process. Generic algorithms and/or simulated annealing are used to perform various types of searches. Hidden Markov chains and/or artificial neural networks are used to perform variable prediction. One skilled in the art will recognize that the cognitive engine 108 may include other conventional features found in a conventional cognitive radio system.

In one embodiment, the cognitive engine 108 applies case-based reasoning and reinforcement learning techniques to dynamically select a channel for vehicular communications as described below with reference to FIG. 2. The vehicular communication and a channel for the vehicular communication are described below in more detail. The cognitive engine 108 is described below in more detail with reference to FIGS. 2 and 4A-7.

The software-defined radio (SDR) 110 is a radio communication system implemented using software installed in a computing device. For example, the software-defined radio 110 is a radio communication system that implements components such as mixers, filters, amplifiers, modulators, demodulators and detectors, etc., using software. In one embodiment, the software-defined radio 110 receives a set of radio configurations from the cognitive engine 108 and configures the vehicular communication for the vehicular system 150 based at least in part on the set of radio configurations. For example, the software-defined radio 110 enables a vehicular system 150 to communicate with other vehicular systems 150 and/or the infrastructure system 160 according to the set of radio configurations. In one embodiment, the software-defined radio 110 includes, among other things, a radio interface 112. In other embodiments, the software-defined radio 110 includes a plurality of radio interfaces 112.

A radio interface 112 is an interface that establishes a communication link for data communication. For example, the radio interface 112 included in a vehicular system 150 is an interface interacting with a wireless communication environment directly for data communication between the vehicular system 150 and other vehicular systems 150 and/or the network 105.

The sensor 114 is any type of conventional sensor configured to collect any type of data. For example, the sensor 114 is one of the following: a light detection and ranging (LIDAR) sensor; an infrared detector; a motion detector; a thermostat; and a sound detector, etc. Persons having ordinary skill in the art will recognize that other types of sensors are possible. In one embodiment, the sensor 114 measures a condition related to a vehicle and generates sensor data describing the condition. For example, the sensor 114 measures a speed of a vehicle and sends sensor data describing the speed to the cognitive engine 108.

In one embodiment, the vehicular system 150 includes a combination of different types of sensors 114. For example, the vehicular system 150 includes a speed sensor for monitoring a speed of a vehicle, a location sensor for detecting a location of the vehicle and a spectrum sensor for sensing a spectrum, etc.

The user interaction module 118 is a device configured to handle communications between the user 116 and the control unit 102. For example, the user interaction module 118 includes one or more of a display, a touch screen, a microphone and/or a speaker system. In one embodiment, the user interaction module 118 receives inputs from the user 116 and sends the inputs to the control unit 102. For example, the user interaction module 118 includes a touch screen and the user 116 provides offline planning on the channel selection to the cognitive engine 108 via the touch screen.

In one embodiment, the user interaction module 118 is configured to communicate an output from the control unit 102 to the user 116. For example, the user interaction module 118 receives channel selection feedback (e.g., a channel reward, a channel throughput and/or a channel opportunity, etc.) from the cognitive engine 108 and provides the channel selection feedback to the user 116. The channel reward, the channel throughput and the channel opportunity are described below with reference to FIG. 2. One having ordinary skill in the art will recognize that the user interaction module 118 may include other types of devices for providing the functionality described herein.

The environment database 136 is a non-transitory memory that stores data. For example, the environment database 136 is a dynamic random access memory (DRAM) device, a static random access memory (SRAM) device, flash memory or some other memory device known in the art. In one embodiment, the environment database 136 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art.

In one embodiment, the environment database 136 stores environmental data for providing the functionality described herein. The environmental data is data associated with a communication environment. For example, the environmental data includes terrain data describing terrain characteristics at one or more locations, radio propagation characteristics at one or more locations, traffic conditions at one or more locations (e.g., traffic conditions in rush hours, non-rush hours, etc.), channel characteristic data at one or more locations (e.g., channel usage characteristic for primary and secondary nodes, historic data describing node densities at one or more locations, traffic intensity data for primary and secondary nodes, etc.), etc. The primary and secondary nodes are described below.

In one embodiment, a communication environment for a vehicular system 150 embedded in a vehicle is described by one or more of the environmental data described above: policy data describing one or more policies for spectrum access; standard data describing one or more standards for spectrum access, etc. The policy data and the standard data are described below in more detail with reference to FIG. 3. In one embodiment, the communication environment is non-stationary since the vehicle moves over time.

The cognition database 140 is a non-transitory memory that stores data. For example, the cognition database 140 is a dynamic random access memory (DRAM) device, a static random access memory (SRAM) device, flash memory or some other memory device known in the art. In one embodiment, the cognition database 140 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art.

In one embodiment, the cognition database 140 stores one or more of policy data, case data, rule data and standard data for providing the functionality described herein. The cognition database 140 is described below in more detail with reference to FIG. 3.

The user 116 is a human user. In one embodiment, the user 116 is a driver driving a vehicle on a road. In another embodiment, the user 116 is a passenger sitting on a passenger seat in a vehicle. The user 116 interacts with the vehicular system 150 embedded in the vehicle via the user interaction module 118.

The infrastructure system 160 is a system for providing services to one or more vehicular systems 150. In one embodiment, the infrastructure system 160 includes one or more computer systems and/or one or more storage devices for providing any service (e.g., Internet services, voicemail services, etc.) available to a vehicular system 150. Although only one infrastructure system 160 is shown in FIG. 1, one skilled in art will recognize that the system 100 may include any number of infrastructure systems 160.

A communication node is an entity for data communication. For example, a communication node is one of a vehicular system 150, an infrastructure system 160, a communication node installed at roadside and any other communication node included in the network 105 (e.g., a router, a switch device, etc.). A vehicular communication is a communication between a vehicular system 150 and another communication node. For example, a vehicular communication is one of a vehicle-to-vehicle communication, a vehicle-to-roadside communication and a vehicle-to-infrastructure communication.

In one embodiment, the vehicular communication between two communication nodes involves more than one type of vehicular communication. For example, the vehicular communication between a first vehicular system 150 and the infrastructure system 160 involves a vehicle-to-vehicle communication between the first vehicular system 150 and a second vehicular system 150 and a vehicle-to-infrastructure communication between the second vehicular system 150 and the infrastructure system 160.

A channel for a vehicular communication is a channel for communicating data between two communication nodes. For example, a channel for a vehicle-to-vehicle communication in the United States is a channel at 5.9 GHz with a 75 MHz bandwidth for dedicated short-range communications (DSRC). In one embodiment, a channel for a vehicular communication includes one of a dedicated channel (e.g., a channel at a frequency band for DSRC), a free access channel (e.g., a completely free channel in the industrial, scientific and medical (ISM) band such as WiFi and Bluetooth, a partially free channel having free access in known frequency ranges such as TV ultra high frequency (UHF), a partially free channel having free access during specific time, etc.) and an opportunistic access channel (e.g., TV whitespace band).

In one embodiment, communications conducted in the dedicated channels are prioritized. For example, private data communications are yielded to public safety-related communications when dedicated channels are used for the data communication. In one embodiment, an opportunistic access channel is one of a channel with fixed locations for primary nodes (e.g., TV signals, paging bands, etc.) and a channel with unknown locations for primary nodes (e.g., a channel in cellular networks, etc.).

A primary node for a channel is a communication node that has a priority to use the channel for data communication. For example, a primary node is an entity having a license for a spectrum used in the channel. A secondary node for a channel is a communication node that borrows the channel from one or more primary nodes of the channel and applies the channel for data communication. In one embodiment, the secondary node does not have a license for a spectrum used in the channel. In another embodiment, a secondary node is allowed to borrow the channel from one or more primary nodes when the channel is idle (e.g., none of the primary nodes have any data to transmit).

The system 100 is particularly advantageous for vehicular communications since, for example, the system 100 solves spectrum scarcity for the vehicular communications by intelligently providing more spectrum options for two communication nodes in the vehicular communications. For example, the system 100 utilizes whitespace spectrum for vehicular communications by dynamically accessing the spectrum based at least in part on the characteristics of the vehicular wireless environment. The system 100 adapts to guarantee the quality of service for data communication and mitigate congestion in dedicated channels for vehicular communications meanwhile minimizing the channel interference.

As described below in more detail, the system 100 applies a case-based reasoning approach by exploiting historic cases for channel selection and automatically adapts to the changes of the communication environment by employing a learning process for the channel selection. In one embodiment, the system 100 optimizes the spectrum access for data communication by switching the spectrum access from a first channel residing at a first frequency to a second channel residing at a second frequency in the whitespace spectrum if, for example, the first channel becomes unavailable or the second channel outperforms the first channel.

Cognitive Engine

Figure 2:
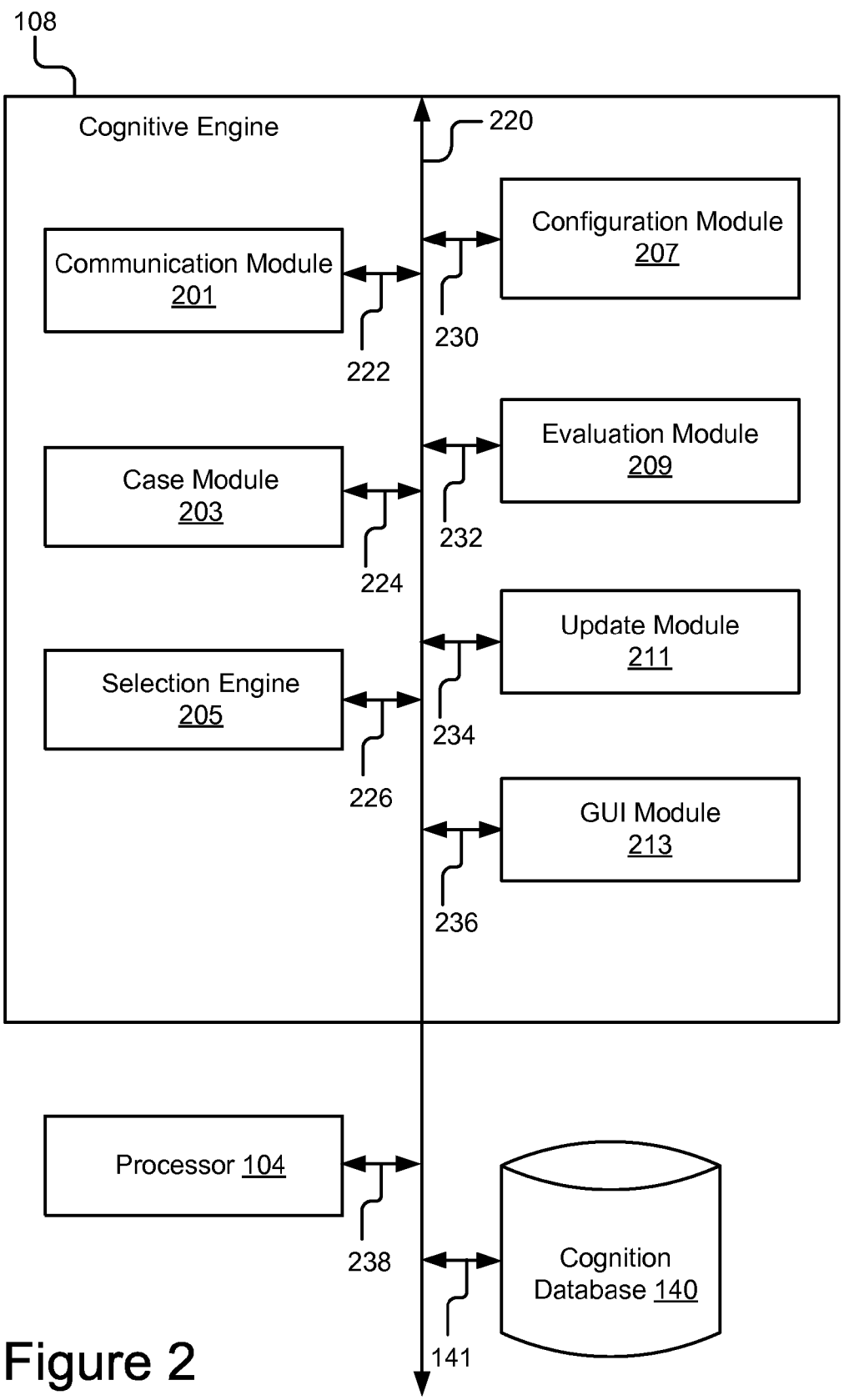
FIG. 2 is a block diagram illustrating a cognitive engine according to one embodiment.

Referring now to FIG. 2, the cognitive engine 108 is shown in more detail. FIG. 2 is a block diagram illustrating a cognitive engine 108 according to one embodiment. The cognitive engine 108 includes a communication module 201, a case module 203, a selection engine 205, a configuration module 207, an evaluation module 209, an update module 211 and a graphical user interface (GUI) module 213. These components of the cognitive engine 108 are communicatively coupled to each other via a bus 220. The processor 104 is communicatively coupled to the bus 220 via signal line 238. The cognition database 140 is communicatively coupled to the bus 220 via signal line 141.

The communication module 201 is code and routines for handling communications between components of the cognitive engine 108 and other components of the system 100. For example, the communication module 201 receives sensor data from one or more sensors 114 and sends the sensor data to one or more of the case module 203, the selection engine 205 and the evaluation module 209. The communication module 201 is communicatively coupled to the bus 220 via signal line 222. In one embodiment, the communication module 201 also handles communications among the components of the cognitive engine 108. For example, the communication module 201 receives a channel reward from the evaluation module 209 and sends the channel reward to the update module 211. The channel reward is described below in more detail.

In one embodiment, the communication module 201 retrieves one or more of case data, rule data, policy data and standard data from the cognition database 140 and sends the retrieved data to the case module 203. In another embodiment, the communication module 201 retrieves environmental data from the environment database 136 and sends the environmental data to one or more of the case module 203, the selection engine 205 and the evaluation module 209. In yet another embodiment, the communication module 201 receives updated rule data and/or updated case data from the update module 211 and stores the updated rule data and/or updated case data in the cognition database 140. One skilled in the art will recognize that the communication module 201 may provide other functionality described herein.

The case module 203 is code and routines that, when executed by the processor 104, determines a matching case for a present case. For example, the case module 203 cross-references the case data stored in the cognition database 140 and determines the matching case as a historic case stored in the cognition database 140 that matches to the present case. The case module 203 is communicatively coupled to the bus 220 via signal line 224.

A present case is a case describing a current communication environment for data communication associated with a vehicular system 150 embedded in a vehicle. For example, a present case includes case data describing a current communication environment in which a vehicular system 150 intends to transmit data. A historic case is an example that provides historic data for optimizing dynamic spectrum access in a communication environment based on past experience. For example, a historic case includes case data describing a historic optimized solution for selecting a channel to transmit data in a specific communication environment based on past experience.

A matching case is a historic case that matches to a present case. For example, a matching case is a historic case stored in the cognition database 140 that has a minimal distance to the present case. In one embodiment, a matching case is a historic case that communicates data in a communication environment matching to the current communication environment associated with the present case. In one embodiment, the current communication environment for the present case is associated with the same location as the communication environment for the matching case. In another embodiment, the current communication environment for the present case is associated with a different location from the communication environment for the matching case.

A distance between two cases is a parameter characterizing a similarity of the two cases. For example, a zero distance between two cases indicates that the two cases are exactly the same. In one embodiment, the distance between two cases is associated with the similarity of the communication environments in the two cases. For example, if a first communication environment associated with a first case is the same as a second communication environment associated with a second case, the first case and the second case have a zero distance. In one embodiment, the measurement of a distance between two cases is defined by an administrator of the system 100. For example, an administrator defines one or more factors (e.g., location, time, terrain characteristics, whitespace spectrum distribution, government regulations, etc.) associated with a communication environment as parameters to calculate a distance between two cases. The case module 203 calculates the distance based at least in part on the one or more factors.

A case (e.g., a present case or a historic case) is described by case data. In one embodiment, the case data describes a communication environment associated with a case. For example, the case data includes one or more of location data describing a location associated with the case (e.g., a location at which the case occurs), environmental data associated with the location, traffic data associated with the location, weather data associated with the location and one or more channel profiles associated with one or more available channels at the location, etc. In one embodiment, the case data additionally includes one or more of policy data, standard data and rule data associated with the case. One skilled in the art will recognize that the case data may include any other data associated with a case.

A channel profile is profile data associated with a channel. In one embodiment, a channel profile associated with a channel includes one or more of a channel value, a channel index and a channel visit number (e.g., the number of channel visits). The channel value and the channel index are described below in more detail.

In one embodiment, the case module 203 receives sensor data from one or more sensors 114. The sensor data includes one or more of location data describing the location of a vehicle is, speed data describing the speed of the vehicle, traffic data describing the traffic condition at the location and weather data describing weather conditions at the location, etc. One skilled in the art will recognize that the sensor data may include other type of data generated by sensors 114. The case module 203 retrieves environmental data from the environment database 136 based at least in part on the location data.

In one embodiment, the case module 203 retrieves policy data and standard data from the cognition database 140 based at least in part on the location data. The policy data and the standard data are described below with reference to FIG. 3. The case module 203 generates rule data based at least in part on the policy data and standard data. The rule data is data describing one or more rules for selecting a channel at a location. For example, the rule data includes data describing a whitespace spectrum distribution at a location and data describing one or more government regulations for selecting a channel from the whitespace spectrum. In one embodiment, the case module 203 stores the rule data in the cognition database 140.

The case module 203 defines a present case for a vehicular system 150 in the current communication environment based at least in part on one or more of the sensor data, the environmental data and the rule data. For example, the case module 203 configures the case data associated with the present case based at least in part on the sensor data, the environmental data and the rule data.

In one embodiment, the case module 203 retrieves case data describing one or more historic cases from the cognition database 140. For example, the case module 203 retrieves the case data describing all the historic cases from the cognition database 140. The case module 203 determines a matching case for the present case from all the historic cases. For example, the case module 203 determines the distance between each of the historic cases and the present case. The case module 203 selects a historic case that has a minimal distance to the present case as a matching case for the present case.

The case module 203 retrieves one or more channel profiles associated with the matching case from the cognition database 140 and configures the case data associated with the present case based at least in part on the one or more channel profiles associated with the matching case. For example, the case module 203 initializes one or more channel profiles for the present case based on the one or more channel profiles associated with the matching case. The case module 203 sends the case data associated with the present case to the selection engine 205. For example, the case module 203 sends the one or more channel profiles for the present case to the selection engine 205. In one embodiment, the case module 203 stores the one or more channel profiles for the present case in the cognition database 140.

It is particularly beneficial to determine a matching case for a present case and initially configure the present case based on the matching case since, for example, the matching case provides a historic optimized solution for spectrum access in a communication environment similar to a current communication environment in the present case based on past experience. Utilizing historic channel profiles included in the matching case can avoid repeated searches for an optimized solution in similar communication environments encountered before and, thus, reduce the convergence time of the cognitive engine 108 when using the cognitive engine 108 to optimize the dynamic spectrum access.

The selection engine 205 is code and routines that, when executed by the processor 104, selects a channel for data communication. The selection engine 205 is communicatively coupled to the bus 220 via signal line 226. In one embodiment, the selection engine 205 receives rule data and one or more channel profiles associated with one or more channels for a present case from the case module 203. In another embodiment, the selection engine 205 retrieves rule data and one or more channel profiles associated with one or more channels for the present case from the cognition database 140. The selection engine 205 selects a channel to transmit data for the present case based at least in part on the one or more channel profiles and the rule data of the present case as described below.

In one embodiment, the selection engine 205 determines a learning strategy for channel selection. A learning strategy is a strategy applied in the channel selection. In one embodiment, a learning strategy is one of an exploration strategy and an exploitation strategy. An exploitation strategy is a strategy to exploit an existing optimal channel for data communication. An existing optimal channel is a channel that has the best performance among all the available channels for the present case. An exploration strategy is a strategy to explore further in all the available channels attempting to discover a fallback channel for the existing optimal channel. A fallback channel is a channel that has better performance than other channels except the existing optimal channel.

In one embodiment, an existing optimal channel is a channel that has a maximal channel value among all the available channels for the present case. A channel value is a parameter of a channel profile. In one embodiment, a higher channel value is associated with a better channel performance. The channel value is described further below with reference to the update module 211. In one embodiment, an existing optimal channel for the present case changes over time, since the one or more channel profiles associated with the one or more available channels for the present case (or, the channel values for the one or more available channels) are updated over time as described below. For example, in a first time instance an existing optimal channel for the present case is a first channel from all the available channels, while in a second time instance an existing optimal channel is a second channel from the available channels because the first channel is no longer available.

In one embodiment, the selection engine 205 uses an ϵ-greedy algorithm to determine a learning strategy. The ϵ-greedy algorithm is a method that attempts to find a global optimum by making optimal choices locally at each stage. For example, the selection engine 205 applies the ϵ-greedy algorithm to determine whether to select the exploration strategy or the exploitation strategy. The symbol "ϵ" represents a number with a value between "0" and "1." In one embodiment, the selection engine 205 generates a random number having a value between "0" and "1." If the random number is less than "$\epsilon$," the selection engine 205 selects an exploration strategy. Otherwise, the selection engine 205 selects an exploitation strategy.

If the exploitation strategy is selected, the selection engine 205 selects a channel that has a maximal channel value (e.g., an existing optimal channel) based at least in part on the one or more channel profiles. On the other hand, if the exploration strategy is selected, the selection engine 205 selects a channel that has a maximal channel index based at least in part on the one or more channel profiles. A channel index is a parameter of a channel profile. The channel index is associated with a channel value for a channel. In one embodiment, a first channel having a higher channel index than a second channel has more potential to achieve better performance than the second channel. The channel index is described further below with reference to the update module 211.

After selecting a channel, the selection engine 205 sends the selected channel having either a maximal channel index or a maximal channel value to the configuration module 207. For example, the selection engine 205 sends an identifier of the selected channel to the configuration module 207.

In one embodiment, the selection engine 205 is configured to adaptively refine the channel selection over time. For example, the selection engine 205 receives one or more updated channel profiles from the update module 211 and reselects a channel for data communication based at least in part on the updated channel profiles and other remaining channel profiles associated with the present case. In one embodiment, the selection engine 205 reselects a channel by performing operations similar to those described above. The selection engine 205 sends the reselected channel to the configuration module 207 so that the software-defined radio 110 is reconfigured according to the reselected channel. This adaptive channel selection process is further illustrated by FIGS. 4A-4B and 5A-5C.

The configuration module 207 is code and routines that, when executed by the processor 104, configures the software-defined radio 110 for data communication. The configuration module 207 is communicatively coupled to the bus 220 via signal line 230. In one embodiment, the configuration module 207 receives an identifier of a selected channel from the selection engine 205 and generates a set of radio configurations for the selected channel. The configuration module 207 configures the software-defined radio 110 for the selected channel based at least in part on the set of radio configurations so that the software-defined radio 110 transmits data using the selected channel.

For example, the configuration module 207 receives an identifier of a selected channel that has a maximal channel index from the selection engine 205 and generates a set of radio configurations for sensing the selected channel. The configuration module 207 configures the software-defined radio 110 based at least in part on the set of radio configurations so that the software-defined radio 110 performs channel sensing for the selected channel.

As another example, the configuration module 207 receives an identifier of a selected channel that has a maximal channel value from the selection engine 205 and generates a set of radio configurations for sensing and accessing the selected channel. The configuration module 207 configures the software-defined radio 110 based at least in part on the set of radio configurations so that the software-defined radio 110 performs channel sensing for the selected channel and accesses the selected channel for data communication.

The evaluation module 209 is code and routines that, when executed by the processor 104, evaluates performance for a selected channel. The evaluation module 209 is communicatively coupled to the bus 220 via signal line 232. In one embodiment, the evaluation module 209 monitors and measures the channel performance for a selected channel when the software-defined radio 110 senses and/or accesses the channel. For example, the evaluation module 209 measures one or more of contention, interference, noise level, data traffic condition (e.g., congestion, idle, etc.), error rates, etc., for the selected channel.

In one embodiment, the evaluation module 209 predicts a channel opportunity for the selected channel as described below. A channel opportunity is an opportunity that a channel is available for data transmission. For example, a channel opportunity is a probability that a channel is available for a vehicular system 150 to transmit data. A higher channel opportunity for a channel indicates that the channel is more likely to be available.

In one embodiment, the evaluation module 209 receives location data from a sensor 114 that detects a location for a vehicle. The evaluation module 209 receives rule data from the case module 203 and extracts data describing a whitespace spectrum distribution for the location from the rule data. Optionally, the evaluation module 209 retrieves data describing channel usage characteristics for primary nodes of the channel at the location from the environment database 136. The evaluation module 209 also determines noise level, interference, etc., for the selected channel as described above.

The evaluation module 209 determines a channel availability of the selected channel for all secondary nodes based at least in part on one or more of the whitespace spectrum distribution, the channel usage characteristics for primary nodes, the noise level and/or interference, etc. In one embodiment, the secondary nodes include one or more fixed nodes (e.g., communication nodes that do not change positions) and one or more mobile nodes (e.g., communication nodes that change positions over time such as a vehicular system 150). The evaluation module 209 determines a channel availability for the mobile nodes based at least in part on the channel availability for all the secondary nodes.

The evaluation module 209 receives speed data indicating a speed of the vehicle from a sensor 114 that monitors the speed. The evaluation module 209 predicts an activity probability for the primary nodes based at least in part on one or more of the channel usage characteristics for the primary nodes, the noise level, the interference and the speed data. An activity probability for the primary nodes represents a probability that a channel is used by the primary nodes and is not available for use by the secondary nodes. The evaluation module 209 determines a channel opportunity for the channel based on the channel availability for the mobile nodes and the activity probability for the primary nodes.

In one embodiment, the evaluation module 209 determines a channel throughput for the selected channel as described below. A channel throughput of a channel is a data throughput for all communication nodes that use the channel for data communication. A higher channel throughput indicates that the channel is more capable for data communication.

The evaluation module 209 receives location data from a sensor 114 and retrieves density data for one or more secondary nodes at a location specified by the location data from the environment database 136. The evaluation module 209 retrieves traffic intensity data for the one or more secondary nodes at the location from the environment database 136. The traffic intensity data indicates a frequency that the one or more secondary nodes use the channel and the data amount that the one or more secondary nodes transmit using the channel. The evaluation module 209 determines a channel usage for each secondary node based at least in part on the density data and traffic intensity data for the secondary nodes. The evaluation module 209 determines a channel throughput for the channel based at least in part on the channel usage for each secondary node. For example, the evaluation module 209 determines the channel throughput as the sum of the channel usage for each secondary node.

In one embodiment, the evaluation module 209 determines a channel reward for the selected channel based at least in part on the channel opportunity and the channel throughput of the selected channel. A channel reward is a parameter that measures an overall performance of a channel. For example, the evaluation module 209 generates a higher channel reward for a first channel than a second channel if the first channel has a better performance (e.g., higher channel throughput, greater channel opportunity, etc.) than the second channel. The evaluation module 209 sends one or more of the channel opportunity, the channel throughput and the channel reward associated with the selected channel to the update module 211.

The update module 211 is code and routines that, when executed by the processor 104, updates one or more of a channel profile for a selected channel and rule data for a present case. The update module 211 is communicatively coupled to the bus 220 via signal line 234. In one embodiment, the update module 211 receives one or more of the channel opportunity, the channel throughput and the channel reward from the evaluation module 209 and updates the channel profile for the selected channel based at least in part on one or more of the channel opportunity, the channel throughput and the channel reward. For example, the update module 211 updates the channel value, the channel index and the channel visit number for the selected channel based at least in part on the channel reward. In one embodiment, the update module 211 also updates the rule data for the present case based at least in part on one or more of the channel opportunity, the channel throughput and the channel reward.

For example, the update module 211 updates the channel visit number in the channel profile for the selected channel as:

$$n(s) \leftarrow n(s)+1.$$

The symbol "s" represents the selected channel. The symbol "n(s)" represents a channel visit number for the selected channel. The update module 211 updates the channel value in the channel profile for the selected channel using a constant-α Monte Carlo method:

$$V(s) \leftarrow V(s)+\alpha(R(s)-V(s)).$$

The symbol "V(s)" represents a channel value for the selected channel. The symbol "R(s)" represents a channel reward for the selected channel. The symbol "α" represents a learning rate between "0" and "1." After updating the channel value, the update module 211 updates the channel index in the channel profile for the selected channel as:

$$I(s) = V(s) + \sqrt{\frac{2\ln\left(\sum_{1<j<K} n(j)\right)}{n(s)}}.$$

The symbol "I(s)" represents a channel index for the selected channel. The symbol "K" represents the total number of available channels for the present case. The symbol "n(j)" represents a channel visit number for the "j" channel.

The update module 211 determines whether to continue a learning process for the channel selection. For example, the update module 211 determines whether to instruct the selection engine 205 to reselect a channel for data communication based at least in part on the updated channel profile. The learning process is described below in more detail. If the update module 211 determines to continue the learning process, the update module 211 instructs the selection engine 205 to reselect a channel based on the updated channel profile and other channel profiles associated with the present case by following the operations described above with reference to the selection engine 205. If the update module 211 determines to stop the learning process, the update module 211 stores the case data for the present case including the updated channel profile and other remaining channel profiles in the cognition database 140 so that the present case will be treated as a historic case for future use. The update module 211 also stores the rule data associated with the present case in the cognition database 140.

The GUI module 213 is code and routines that, when executed by the processor 104, generates graphical data for providing a GUI to a user. The GUI module 213 is communicatively coupled to the bus 220 via signal line 236. In one embodiment, the GUI module 213 generates graphical data for depicting a GUI to allow a user to interact with the channel selection process. For example, the GUI module 213 generates graphical data for depicting a GUI to provide channel selection feedback (e.g., a channel opportunity, a channel throughput, a channel reward, etc.) to a user. The GUI module 213 sends the generated graphical data to the user interaction module 118, causing the user interaction module 118 to present the GUI to the user. In one embodiment, the cognitive engine 108 does not include a GUI module 213 and all or some of the functionality of the GUI module 213 as described above is provided by the user interaction module 118.

A learning process is a process to optimize spectrum access for data communication based on learning experiences. For example, the learning process includes an iteration of a process to select a channel based on the continuously updated channel profiles implemented by the selection engine 205, a process to evaluate channel performance for the selected channel implemented by the evaluation module 209 and a process to update the channel profiles based on the channel performance implemented by the update module 211. In one embodiment, the learning process is implemented using machine learning techniques such as reinforcement learning.

In one embodiment, the long term goals of the learning process are to avoid channel interference, to maximize communication link lifetime and to maximize channel throughput. The learning process automatically incorporates the channel characteristics for the vehicular communications into the process of channel selection by measuring the performance of the channel and updating the channel profiles based on the performance. As a vehicle moves over time, the communication environment for data transmission also changes over time. The learning process automatically adapts to the environmental changes by refining the channel selection based on the channel performance. The learning process therefore enables the system 100 to optimize the communication performance automatically and implement advanced network applications for vehicular communications by performing dynamic spectrum access in a variety of spectrum bands with heterogeneous characteristics over space and time.

Cognition Database

Figure 3:
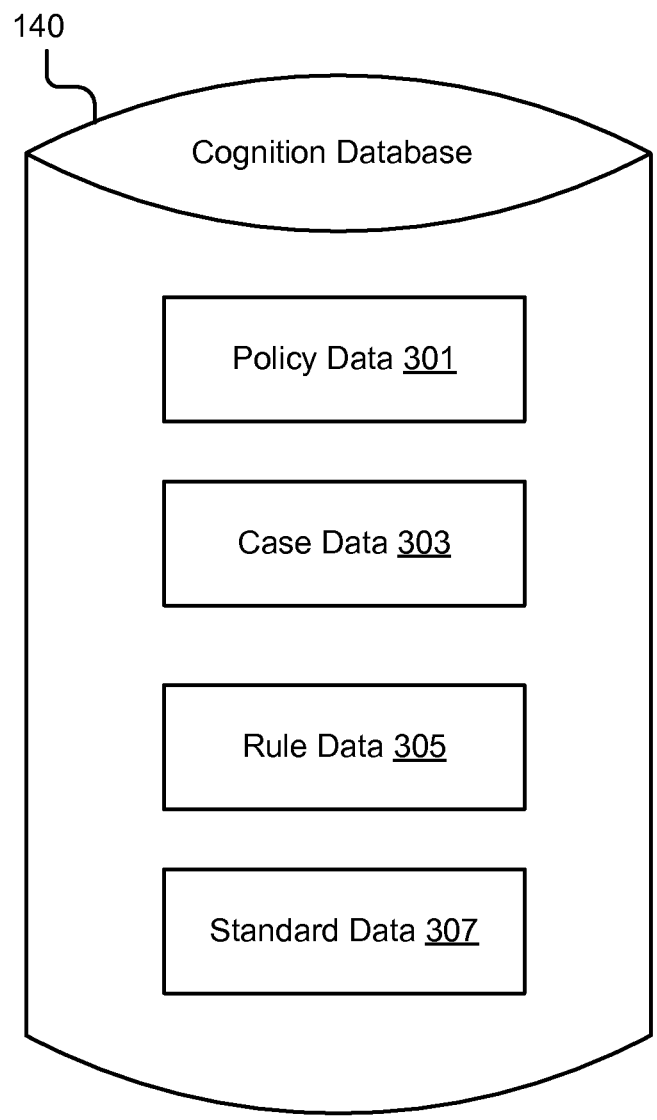
FIG. 3 is a block diagram illustrating a cognition database according to one embodiment.

FIG. 3 is a block diagram illustrating a cognition database 140 according to one embodiment. The cognition database 140 includes, among other things, policy data 301, case data 303, rule data 305 and standard data 307. One skilled in the art will recognize that the cognition database 140 may include other data for providing the functionality described herein.

The policy data 301 is data describing one or more policies for spectrum access at different locations. In one embodiment, the policy data 301 includes one or more regulations for spectrum access (e.g., national regulations published by Federal Communications Commission of the United States, local regulations, primary channel occupancy pattern, etc.).

The case data 303 is data associated with one or more cases. In one embodiment, the case data 303 is data associated with one or more historic cases. The case data 303 includes one or more of location data describing a location for the case, environmental data associated with the location, traffic data associated with the location, weather data associated with the location and one or more channel profiles associated with one or more available channels for the case, etc. In one embodiment, the case data 303 includes rule data associated with the case. One skilled in the art will recognize that the case data 303 may include any other data associated with a case.

The rule data 305 is data describing one or more rules for spectrum access for a case. In one embodiment, the rule data 305 includes data describing one or more rules (e.g., rules based on government regulations or standard requirements, etc.) for selecting a channel for a case. In one embodiment, the rule data 305 includes data describing a whitespace spectrum distribution at a location associated with the case.

The standard data 307 is data describing one or more standards for data communication. For example, the standard data 307 includes one or more standards for wireless communications such as IEEE 802.22 and IEEE 802.11, etc.

Methods

Figure 4A:
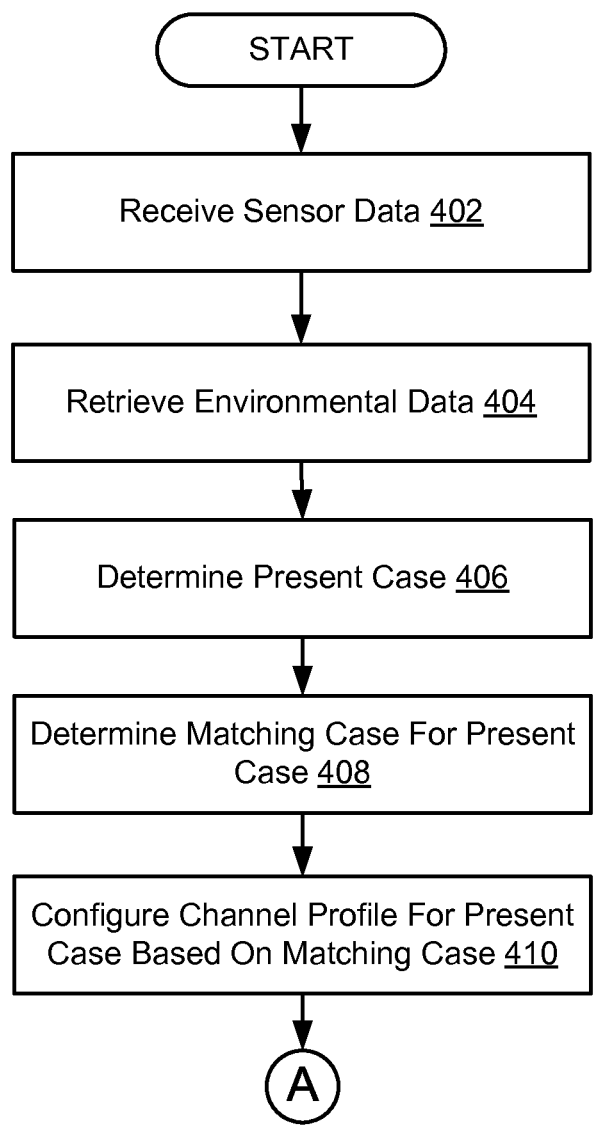
FIGS. 4A and 4B are flowcharts illustrating a method for optimizing dynamic spectrum access according to one embodiment.

Referring now to FIGS. 4A-7, various embodiments of the method of the specification will be described. FIGS. 4A and 4B are flowcharts illustrating a method 400 for optimizing dynamic spectrum access according to one embodiment. Referring to FIG. 4A, the communication module 201 receives 402 sensor data from one or more sensors 114. In one embodiment, the sensor data includes one or more of location data specifying the location of where a vehicle is, weather data describing weather conditions at the location, traffic data describing traffic conditions at the location, etc. The communication module 201 retrieves 404 environmental data (e.g., terrain data describing terrain characteristics for the location, radio propagation characteristics for the location, channel characteristic data at the location, etc.) from the environment database 136. The communication module 201 sends the sensor data and the environmental data to the case module 203.

The case module 203 determines 406 a present case for the vehicular system 150 based at least in part on the sensor data and the environmental data. For example, the case module 203 configures case data associated with the present case based at least in part on the sensor data and the environmental data. The case module 203 determines 408 a matching case for the present case from the cognition database 140. The case module 203 configures 410 one or more channel profiles for the present case based at least in part on one or more channel profiles for the matching case. The case module 203 sends case data associated with the present case to the selection engine 205. For example, the case module 203 sends the one or more channel profiles of the present case to the selection engine 205.

Figure 4B:
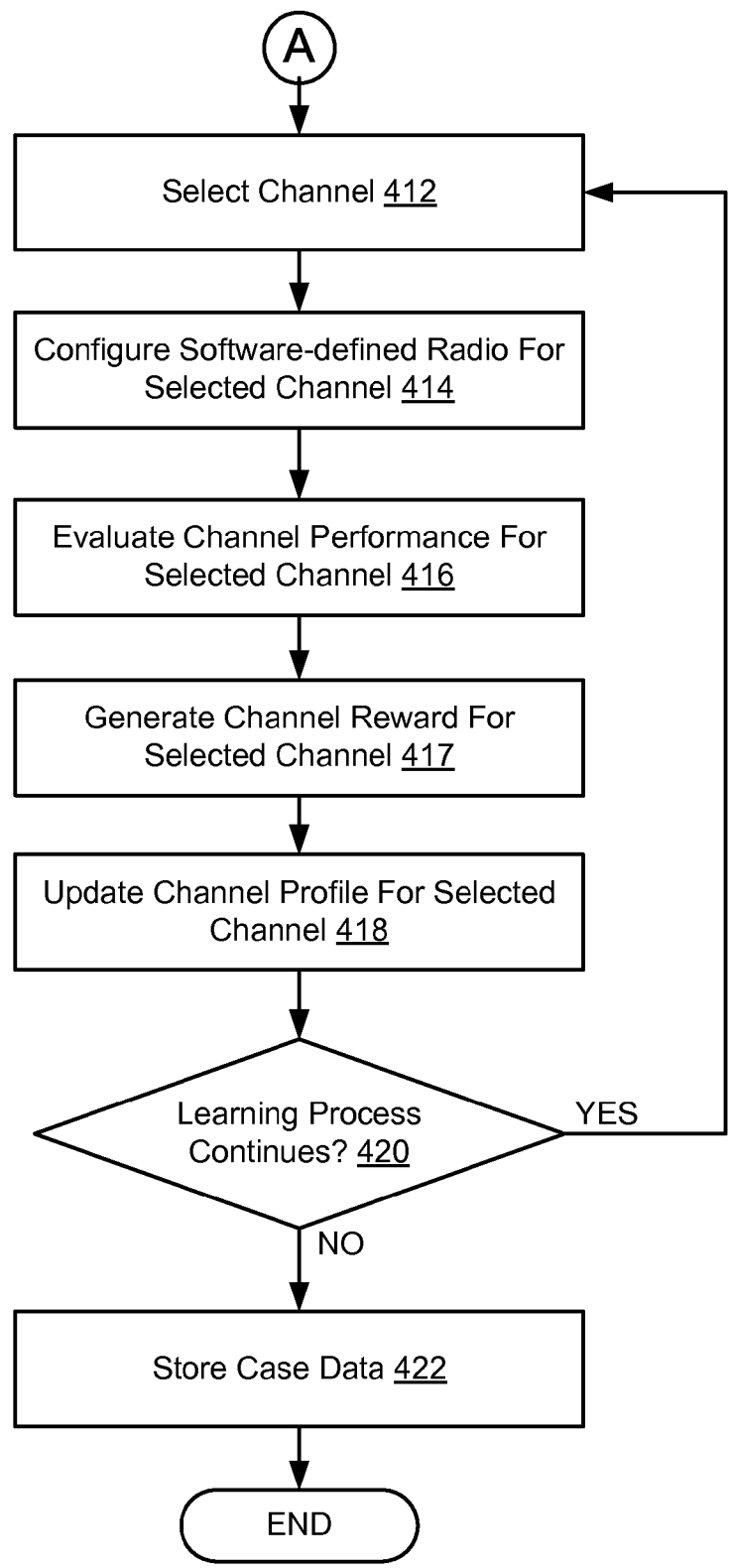

Referring to FIG. 4B, the selection engine 205 selects 412 a channel based at least in part on the one or more channel profiles. The selection engine 205 sends an identifier of the selected channel to the configuration module 207. The configuration module 207 generates a set of radio configurations for the selected channel and configures 414 the software-defined radio 110 based at least in part on the set of radio configurations.

The evaluation module 209 evaluates 416 a channel performance for the selected channel when the software-defined radio 110 senses and/or accesses the channel. The evaluation module 209 generates 417 a channel reward for the selected channel and sends the channel reward to the update module 211. The update module 211 updates 418 the channel profile for the selected channel based at least in part on the channel reward.

The update module 211 determines 420 whether to continue a learning process for the channel selection. If the update module 211 determines to continue the learning process, the method 400 moves to step 412. Otherwise, the method 400 moves to step 422. Turning to step 422, the update module 211 stores the case data including the updated channel profile and other channel profiles for the present case in the cognition database 140 as a historic case for future use.

Figure 5A:
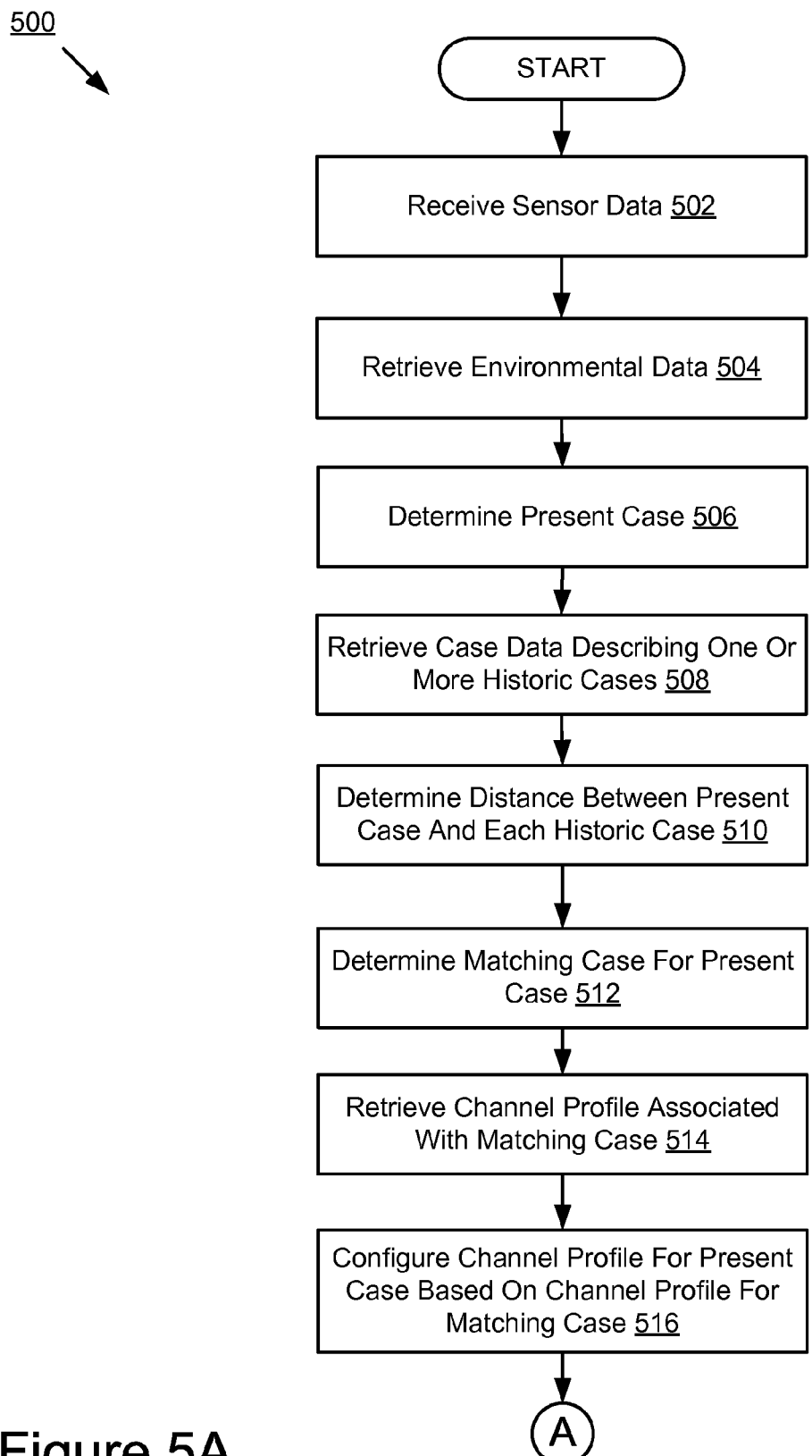
FIGS. 5A-5C are flowcharts illustrating a method for optimizing dynamic spectrum access according to another embodiment.
Figure 5B:
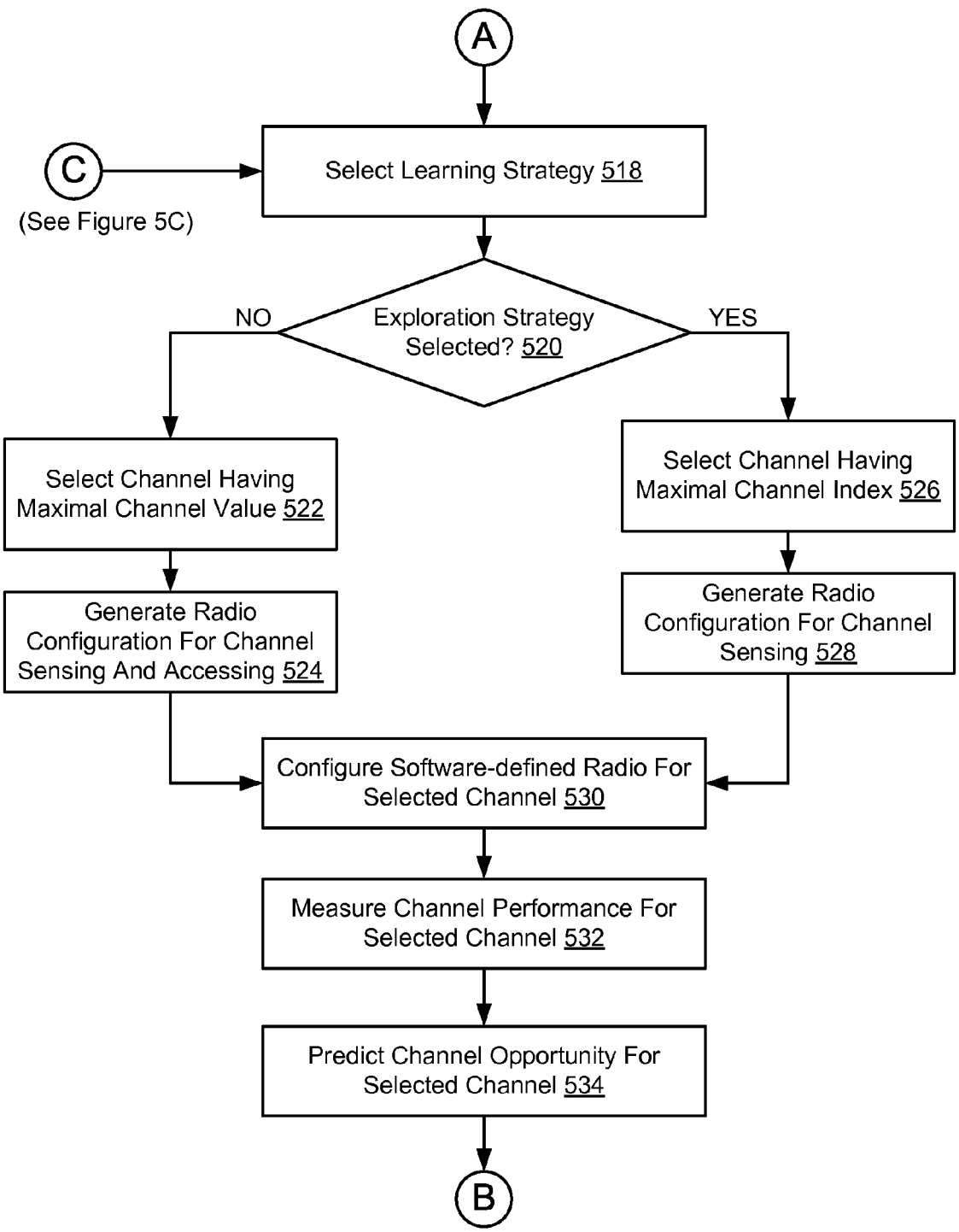
Figure 5C:
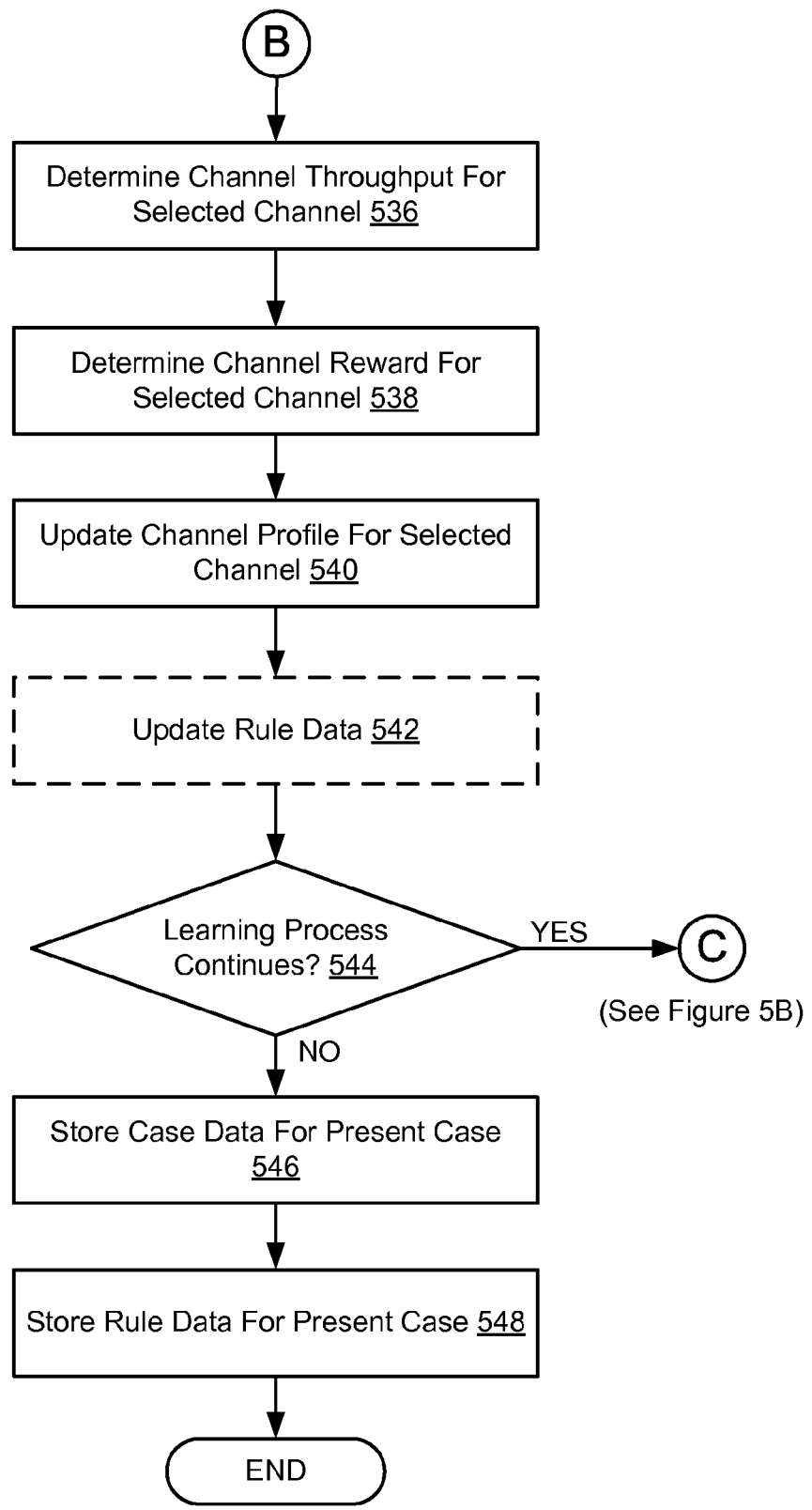

FIGS. 5A-5C are flowcharts illustrating a method 500 for optimizing dynamic spectrum access according to another embodiment. Referring to FIG. 5A, the communication module 201 receives 502 sensor data from one or more sensors 114. The sensor data includes, among other things, location data describing the location of a vehicle, weather data describing weather conditions at the location, traffic data describing the traffic conditions at the location, etc. The communication module 201 retrieves 504 environmental data from the environment database 136 based at least in part on the location data. The communication module 201 sends the sensor data and the environmental data to the case module 203.

The case module 203 determines 506 a present case for the vehicular system 150 based at least in part on the sensor data and the environmental data. For example, the case module 203 configures case data associated with the present case based at least in part on the sensor data and the environmental data. The case module 203 retrieves 508 case data associated with one or more historic cases from the cognition database 140. In one embodiment, the case module 203 retrieves case data associated with all the historic cases from the cognition database 140. The case module 203 determines 510 a distance between the present case and each of the historic cases.

The case module 203 determines 512 a matching case for the present case. In one embodiment, the case module 203 determines a matching case for the present case based at least in part on the distances between the present case and the historic cases. For example, the case module 203 selects a historic case that has a minimal distance to the present case as a matching case for the present case.

The case module 203 retrieves 514 one or more channel profiles associated with the matching case from the cognition database 140. The case module 203 configures 516 one or more channel profiles for the present case based at least in part on the one or more channel profiles associated with the matching case. The case module 203 sends the case data including the one or more channel profiles of the present case to the selection engine 205.

Referring to FIG. 5B, the selection engine 205 selects 518 a learning strategy for channel selection. For example, the selection engine 205 implements an ϵ-greedy algorithm to select a learning strategy. The selection engine 205 determines 520 whether an exploration strategy is selected. If the exploration strategy is selected, the method 500 moves to step 526. Otherwise, the method 500 moves to step 522.

Turning to step 522, the selection engine 205 selects a channel having a maximal channel value from one or more available channels in the present case based at least in part on the one or more channel profiles. The selection engine 205 sends an identifier of the selected channel to the configuration module 207. The configuration module 207 generates 524 a set of radio configurations for sensing and accessing the selected channel.

Turning to step 526, the selection engine 205 selects a channel having a maximal channel index from one or more available channels in the present case based at least in part on the one or more channel profiles. The selection engine 205 sends an identifier of the selected channel to the configuration module 207. The configuration module 207 generates 528 a set of radio configurations for sensing the selected channel.

At step 530, the configuration module 207 configures the software-defined radio 110 for the selected channel. In one embodiment, the configuration module 207 configures the software-defined radio 110 for channel sensing. In another embodiment, the configuration module 207 configures the software-defined radio 110 for channel sensing and accessing.

The evaluation module 209 measures 532 the channel performance for the selected channel when the software-defined radio 110 senses and/or accesses the selected channel. The evaluation module 209 predicts 534 a channel opportunity for the selected channel. In one embodiment, the evaluation module 209 predicts a channel opportunity for the selected channel by performing steps similar to those described below with reference to FIGS. 6A and 6B.

Referring to FIG. 5C, the evaluation module 209 determines 536 a channel throughput for the selected channel. In one embodiment, the evaluation module 209 determines a channel throughput by performing steps similar to those described below with reference to FIG. 7. The evaluation module 209 determines 538 a channel reward for the selected channel based at least in part on the channel opportunity and the channel throughput. The evaluation module 209 sends one or more of the channel opportunity, the channel throughput and the channel reward to the update module 211.

The update module 211 updates 540 the channel profile for the selected channel based at least in part on one or more of the channel opportunity, the channel throughput and the channel reward. Optionally, the update module 211 updates 542 the rule data associated with the present case based at least in part on the channel opportunity, the channel throughput and the channel reward. The update module 211 determines 544 whether to continue a learning process for the channel selection. If the update module 211 determines to continue the learning process, the method 500 moves to step 518. Otherwise, the method 500 moves to step 546.

At step 546, the update module 211 stores the case data including the updated channel profile and other channel profiles for the present case in the cognition database 140 as a historic case for future use. The update module 211 also stores 548 the rule data associated with the present case in the cognition database 140.

Figure 6A:
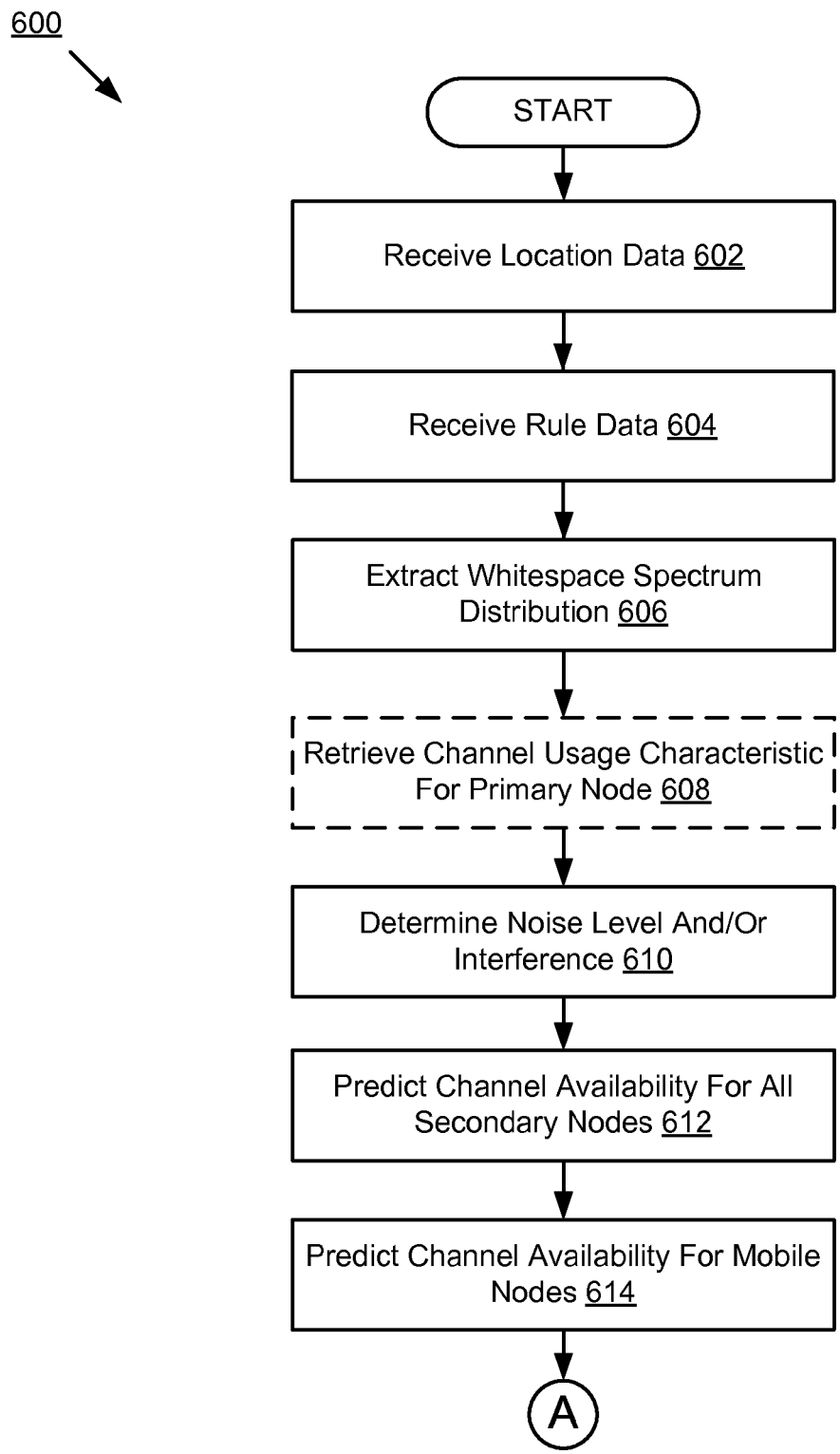
FIGS. 6A and 6B are flow charts illustrating a method for determining a channel opportunity according to one embodiment.
Figure 6B:
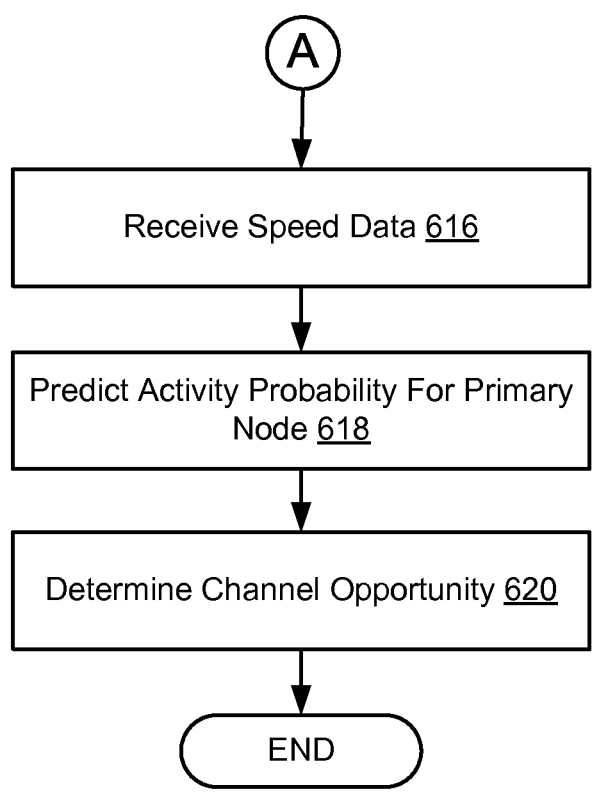

FIGS. 6A and 6B are flow charts illustrating a method 600 for determining a channel opportunity for a channel according to one embodiment. Referring to FIG. 6A, the communication module 201 receives 602 location data specifying the location of a vehicle from a sensor 114. The communication module 201 sends the location data to the evaluation module 209. The evaluation module 209 receives 604 rule data for the present case from the case module 203. The evaluation module 209 extracts 606 data describing a whitespace spectrum distribution at the location from the rule data. Optionally, the evaluation module 211 retrieves 608 data describing channel usage characteristics for primary nodes of the channel from the environment database 136. The evaluation module 209 determines 610 noise level and/or interference for the channel.

The evaluation module 209 predicts 612 a channel availability for all secondary nodes of the channel based at least in part on one or more of the whitespace spectrum distribution, the channel usage characteristics for the primary users, the noise level and/or interference. The evaluation module 209 predicts 614 a channel availability for mobile nodes based at least in part on the channel availability for all secondary nodes.

Referring to FIG. 6B, the communication module 201 receives 616 speed data specifying a speed of the vehicle from a sensor 114. The communication module 201 sends the speed data to the evaluation module 209. The evaluation module 201 predicts 618 an activity probability for the primary nodes based at least in part on the speed data, the channel usage characteristics for the primary nodes, the noise level and/or interference of the channel. The evaluation module 211 determines 620 a channel opportunity for the channel based at least in part on the channel availability of the mobile nodes and the activity probability for the primary nodes.

Figure 7:
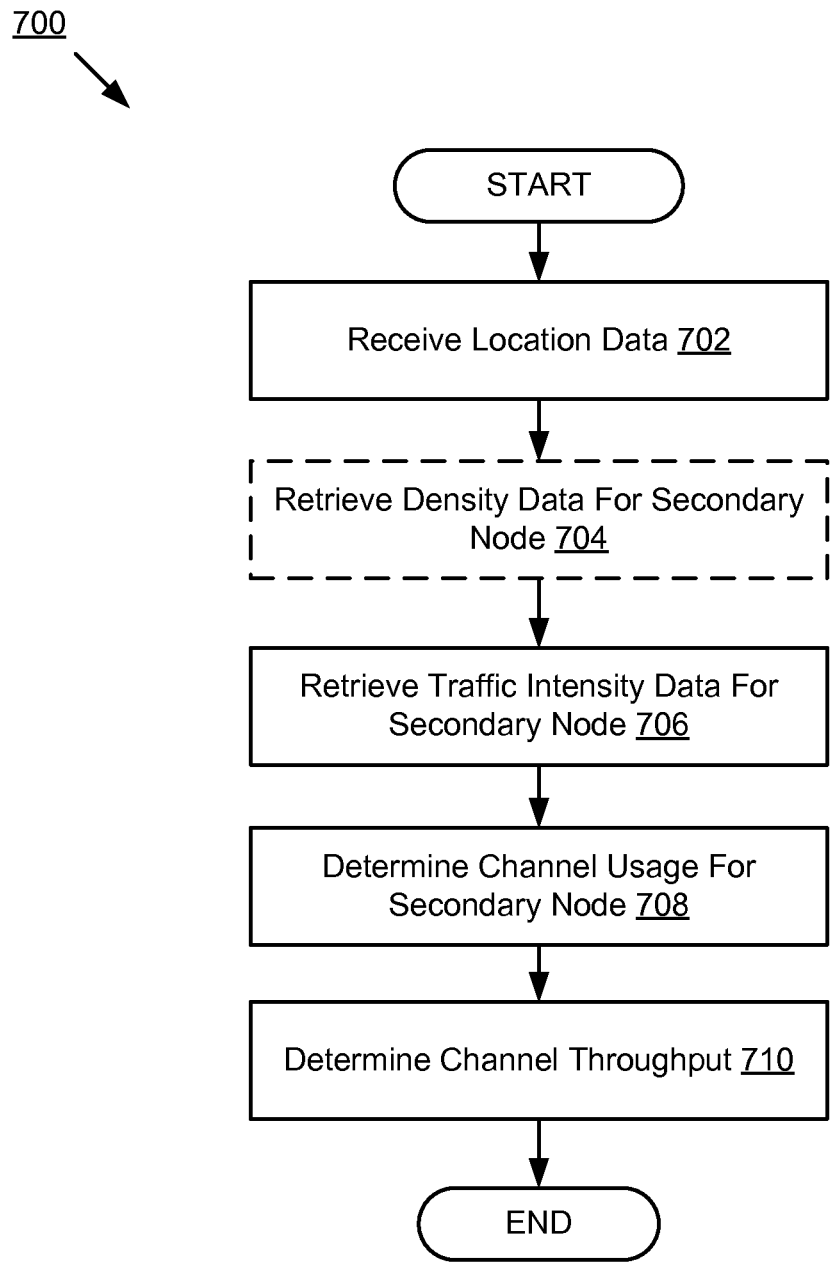
FIG. 7 is a flow chart illustrating a method for determining a channel throughput according to one embodiment.

FIG. 7 is a flow chart illustrating a method 700 for determining a channel throughput for a channel according to one embodiment. The communication module 201 receives 702 location data identifying a location from a sensor 114. Optionally, the communication module 201 retrieves 704 density data for secondary nodes of the channel associated with the location from the environment database 136. The communication module 201 retrieves 706 traffic intensity data for the secondary nodes associated with the location from the environment database 136. The communication module 201 sends one or more of the density data and the traffic intensity data for the secondary nodes to the evaluation module 209.

The evaluation module 209 determines 708 a channel usage for each secondary node. The evaluation module 209 determines 710 a channel throughput for the channel based at least in part on the channel usage for each secondary node.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for optimizing dynamic spectrum access in communications, the method comprising:
storing case data in a cognition database describing historic cases reflecting historic optimized solutions for spectrum access in specific communication environments based on past experiences;
determining a present case based at least in part on sensor data and environmental data, the present case describing a current communication environment;
determining distances between the present case and the historic cases based on one or more distance measurement factors, each distance describing a parameter characterizing a similarity between the present case and a corresponding historic case;
selecting, as a matching case, a historic case from the historic cases stored in the cognition database using the distance of the historic case to the present case, the matching case being optimized for spectrum access in a communication environment similar to the current communication environment based on a past experience;
retrieving one or more channel profiles associated with the matching case from the cognition database;
configuring case data including one or more channel profiles for the present case based at least in part on the one or more channel profiles associated with the matching case; and
storing configured case data including the one or more channel profiles for the present case in the cognition database as a new historic case for future use.

2. The method of claim 1, further comprising:
selecting a first channel based at least in part on the one or more channel profiles, the first channel associated with a first channel profile from the one or more channel profiles;
evaluating a first channel performance for the first channel and generating a first channel reward for the first channel; and
updating the first channel profile based at least in part on the first channel reward.

3. The method of claim 2, wherein generating the first channel reward further comprises:
predicting a channel opportunity for the first channel;
determining a channel throughput for the first channel; and
generating the first channel reward based at least in part on the channel opportunity and the channel throughput.

4. The method of claim 2, further comprising:
selecting a second channel based at least in part on the updated first channel profile and other remaining channel profiles from the one or more channel profiles, the second channel associated with a second channel profile from the one or more channel profiles;
evaluating a second channel performance for the second channel and generating a second channel reward for the second channel; and
updating the second channel profile based at least in part on the second channel reward.

5. The method of claim 2, wherein the first channel profile includes a channel value, a channel index and a channel visit number.

6. The method of claim 5, wherein updating the first channel profile further comprises:
updating the channel value, the channel index and the channel visit number for the first channel.

7. The method of claim 2, wherein selecting the first channel based at least in part on the one or more channel profiles further comprises:
selecting a channel that has a maximal channel value.

8. The method of claim 2, wherein selecting the first channel based at least in part on the one or more channel profiles further comprises:
selecting a channel that has a maximal channel index.

9. The method of claim 1, wherein the current communication environment is characterized by one or more of traffic conditions at a location associated with the present case, channel usage characteristics for one or more data communication channels available at the location, terrain characteristics at the location, and radio propagation characteristics at the location.

10. The method of claim 1, wherein selecting, as the matching case, the historic case from the historic cases stored in the cognition database using the distance of the historic case to the present case further comprises:
selecting a historic case from the historic cases that has a minimal distance to the present case.

11. The method of claim 1, wherein the one or more distance measurement factors are defined by an administrator and include a location, a time, terrain characteristics, whitespace spectrum distribution, and government regulations.

12. A system for optimizing dynamic spectrum access in communications, the system comprising:
a case module
storing case data in a cognition database describing historic cases reflecting historic optimized solutions for spectrum access in specific communication environments based on past experiences,
determining a present case based at least in part on sensor data and environmental data, the present case describing a current communication environment,
determining distances between the present case and the historic cases based on one or more distance measurement factors, each distance describing a parameter characterizing a similarity between the present case and a corresponding historic case,
selecting, as a matching case, a historic case from the historic cases stored in the cognition database using the distance of the historic case to the present case, the matching case being optimized for spectrum access in a communication environment similar to the current communication environment based on a past experience,
retrieving one or more channel profiles associated with the matching case from the cognition database, and
configuring case data including one or more channel profiles for the present case based at least in part on the one or more channel profiles associated with the matching case; and
an update module communicatively coupled to the case module, the update module storing configured case data including the one or more channel profiles for the present case in the cognition database as a new historic case for future use.

13. The system of claim 12, further comprising:
a selection engine communicatively coupled to the case module, the selection engine selecting a first channel based at least in part on the one or more channel profiles, the first channel associated with a first channel profile from the one or more channel profiles; and an evaluation module communicatively coupled to the case module and the selection engine, the evaluation module evaluating a first channel performance for the first channel and generating a first channel reward for the first channel, wherein the update module is communicatively coupled to the case module, the selection engine, and the evaluation module, and is further configured to update the first channel profile based at least in part on the first channel reward.

14. The system of claim 13, wherein the evaluation module is further configured to:
predict a channel opportunity for the first channel;
determine a channel throughput for the first channel; and
generate the first channel reward based at least in part on the channel opportunity and the channel throughput.

15. The system of claim 13, wherein the selection engine is further configured to select a second channel based at least in part on the updated first channel profile and other remaining channel profiles from the one or more channel profiles, the evaluation module is further configured to evaluate a second channel performance for the second channel and generate a second channel reward for the second channel, and the update module is further configured to update a second channel profile based at least in part on the second channel reward, wherein the second channel is associated with the second channel profile from the one or more channel profiles.

16. The system of claim 13, wherein the first channel profile includes a channel value, a channel index, and a channel visit number.

17. The system of claim 16, wherein the update module is further configured to:
update the channel value, the channel index and the channel visit number for the first channel.

18. The system of claim 13, wherein to select the first channel based at least in part on the one or more channel profiles, the selection engine is further configured to:
select a channel that has a maximal channel value.

19. The system of claim 13, wherein to select the first channel based at least in part on the one or more channel profiles, the selection engine is further configured to:
select a channel that has a maximal channel index.

20. The system of claim 12, wherein the current communication environment is characterized by one or more of traffic conditions at a location associated with the present case, channel usage characteristics for one or more data communication channels available at the location, terrain characteristics at the location, and radio propagation characteristics at the location.

21. The system of claim 12, wherein to select, as the matching case, the historic case from the historic cases stored in the cognition database using the distance of the historic case to the present case further comprises:
selecting a historic case from the historic cases that has a minimal distance to the present case.

22. The system of claim 12, wherein the one or more distance measurement factors are defined by an administrator and include a location, a time, terrain characteristics, whitespace spectrum distribution, and government regulations.

23. A computer program product comprising a non-transitory computer readable medium encoding instructions that, in response to execution by a computing device, cause the computing device to perform operations comprising:

storing case data in a cognition database describing historic cases reflecting historic optimized solutions for spectrum access in specific communication environments based on past experiences;

determining a present case based at least in part on sensor data and environmental data, the present case describing a current communication environment;

determining distances between the present case and the historic cases based on one or more distance measurement factors, each distance describing a parameter characterizing a similarity between the present case and a corresponding historic case;

selecting, as a matching case, a historic case from the historic cases stored in the cognition database using the distance of the historic case to the present case, the matching case being optimized for spectrum access in a communication environment similar to the current communication environment based on a past experience;

retrieving one or more channel profiles associated with the matching case from the cognition database;

configuring case data including one or more channel profiles for the present case based at least in part on the one or more channel profiles associated with the matching case; and storing configured case data including the one or more channel profiles for the present case in the cognition database as a new historic case for future use.

24. The computer program product of claim 23, wherein the instructions cause the computing device to perform operations further comprising:
selecting a first channel based at least in part on the one or more channel profiles, the first channel associated with a first channel profile from the one or more channel profiles;
evaluating a first channel performance for the first channel and generating a first channel reward for the first channel; and
updating the first channel profile based at least in part on the first channel reward.

25. The computer program product of claim 24, wherein generating the first channel reward further comprises:
predicting a channel opportunity for the first channel;
determining a channel throughput for the first channel; and
generating the first channel reward based at least in part on the channel opportunity and the channel throughput.

26. The computer program product of claim 24, wherein the instructions cause the computing device to perform operations further comprising:
selecting a second channel based at least in part on the updated first channel profile and other remaining channel profiles from the one or more channel profiles, the second channel associated with a second channel profile from the one or more channel profiles;
evaluating a second channel performance for the second channel and generating a second channel reward for the second channel; and
updating the second channel profile based at least in part on the second channel reward.

27. The computer program product of claim 24, wherein the first channel profile includes a channel value, a channel index and a channel visit number.

28. The computer program product of claim 23, wherein selecting, as the matching case, the historic case from the historic cases stored in the cognition database using the distance of the historic case to the present case further comprises:

selecting a historic case from the historic cases that has a minimal distance to the present case.

29. The computer program product of claim 23, wherein the current communication environment is characterized by one or more of traffic conditions at a location associated with the present case, channel usage characteristics for one or more data communication channels available at the location, terrain characteristics at the location, and radio propagation characteristics at the location.

30. The computer program product of claim 23, wherein the one or more distance measurement factors are defined by an administrator and include a location, a time, terrain characteristics, whitespace spectrum distribution, and government regulations.

\* \* \* \* \*